| United States Patent [19] | [11] Patent Number: 4,986,379 |
| Morishita | [45] Date of Patent: Jan. 22, 1991 |

[54] MOTORIZED POWER STEERING APPARATUS

[75] Inventor: Mitsuharu Morishita, Himeji, Japan

[73] Assignee: Mitsubishi Denki Kabushiki Kaisha, Tokyo, Japan

[21] Appl. No.: 408,335

[22] Filed: Sep. 18, 1989

[30] Foreign Application Priority Data

Sep. 28, 1988 [JP] Japan .................. 63-243214

[51] Int. Cl.⁵ .............................................. B62D 5/04
[52] U.S. Cl. .................. 180/79.1; 318/599; 388/831
[58] Field of Search ............ 180/79.1; 318/599; 388/804, 811, 819, 829, 831

[56] References Cited

U.S. PATENT DOCUMENTS 4,611,682  9/1986  Yasuda et al. .................. 180/79.1
4,771,843  9/1988  Shimizu .......................... 180/79.1

FOREIGN PATENT DOCUMENTS 0249506    6/1987  European Pat. Off. .
2604408    9/1987  France .
191267     8/1987  Japan .................. 180/79.1
62-251273 11/1987  Japan .
292576    12/1987  Japan .................. 180/79.1
20271      1/1988  Japan .................. 180/79.1
63-71481   3/1988  Japan .
2145678    8/1984  United Kingdom .
2196913    9/1987  United Kingdom .

Primary Examiner—Mitchell J. Hill
Attorney, Agent, or Firm—Sughrue, Mion, Zinn, Macpeak & Seas

[57] ABSTRACT

A motorized power steering apparatus for a vehicle has a torque sensor which generates an output voltage proportional to a steering torque exerted by the driver of the vehicle. A motor controller controls the output torque of a drive motor which generates an auxiliary steering force corresponding to the output voltage of the torque sensor. A current limiter limits the motor current to a value which decreases as the temperature of the motor or the temperatures of power switching elements in the motor controller increases.

6 Claims, 6 Drawing Sheets

MOTORIZED POWER STEERING APPARATUS

BACKGROUND OF THE INVENTION

This invention relates to a motorized power steering apparatus for automobiles or other vehicles. In the past, power steering apparatuses for automobiles were usually driven by hydraulic power generated by a pump. However, as hydraulic systems are bulky and heavy, in recent years, there has been a trend towards the use of electric motors to provide the drive force for power steering. A power steering apparatus which employs an electric motor to generate an auxiliary torque to assist the steering of the vehicle is referred to as a motorized power steering apparatus.

In a motorized power steering apparatus, a torque sensor measures the steering-torque applied by the driver to a steering wheel. An electric motor which is connected to a suitable portion of the steering gear is then controlled by a control unit in accordance with the measured torque to impart an auxiliary steering force to the steering gear. The auxiliary steering force lessens the force which need by applied to the steering wheel be the driver.

The control unit for controlling the motor typically employs semiconductor power switching elements. The semiconductor power switching elements and the motor are usually designed for operation for only a short period of time at a relatively low rated current. However, when the vehicle is stationary and the steering wheel is turned by the driver as far as it will go in one direction and maintained in that position for a long period, the steering torque sensor senses a large steering torque, and the control unit sends a large current through the motor for an extended length of time. As the control unit and the motor are not designed to handle a large continuous current for an extended period, there is a possibility of their overheating and burning out or being otherwise damaged by heat.

It is possible to design the motor and control unit to handle a large continuous current, but doing so makes them undesirably large and expensive.

SUMMARY OF THE INVENTION

It is an object of the present invention to provide a motorized power steering apparatus which can prevent damage to the motor and the control unit of the apparatus when a large steering torque is applied for an extended period of time.

It is another object of the present invention to provide a motorized power steering apparatus which can employ an inexpensive motor and switching elements having a low rated current.

It is another object of the present invention to provide a motorized power steering apparatus which is reliable, simple in structure, and inexpensive.

A motorized power steering apparatus in accordance with the present invention has a torque sensor for generating an output voltage indicative of the steering torque exerted by a driver of the vehicle. An electric motor for applying an auxiliary steering force to a steering gear is controlled by a motor controller having switching elements so that the motor generates a torque which is proportional to the output voltage of the torque sensor. A current limiting device limits the maximum current flowing through the motor to a value which decreases as with an increase of a temperature which depends upon the motor current. As a result, the motor and the switching elements can automatically be prevented from reaching a temperature at which they could undergo heat damage.

In preferred embodiments, the current limiting device limits the motor current in accordance with the temperature of both the motor and the switching elements of the motor controller. However, the motor current could instead be limited on the basis of only one of the two temperatures.

Preferably, the torque sensor has a right turn potentiometer which generates an output voltage proportional to the steering torque only when the steering torque is in a direction to steer the vehicle to the right and a separate left turn potentiometer which generates an output voltage proportional to the steering torque only when the steering torque is in a direction to steer the vehicle to the left. The motor controller controls the voltage which is applied to the motor in accordance with the output voltage of only one of the potentiometers at a time. The motor controller preferably includes a logic circuit which prevents the motor from operating when both of the potentiometers simultaneously generate an output voltage of above a prescribed level.

The motor controller is not restricted to any particular type, but in preferred embodiments, it is a self-excited pulse width modulation circuit with feedback from the motor. The pulse width modulation circuit generates output pulses having a pulse width which is modulated by the output voltage of the torque sensor.

DESCRIPTION OF THE PREFERRED EMBODIMENTS

Figure 1:
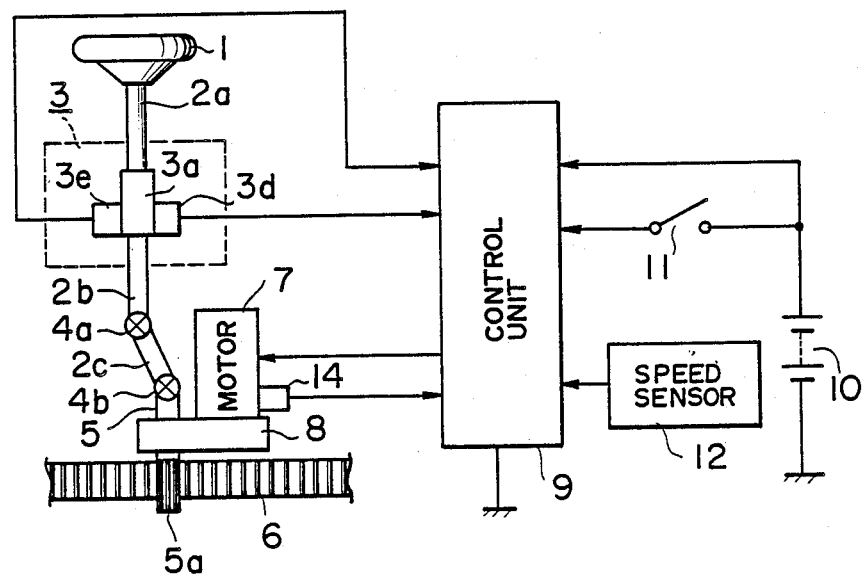
FIG. 1 is a block diagram of an embodiment of a motorized power steering apparatus according to the present invention.

A preferred embodiment of a motorized power steering apparatus according to the present invention will now be described while referring to the accompanying drawings. As shown in FIG. 1, which is a block diagram of this embodiment, a steering wheel 1 of an automotive vehicle is mounted on the upper end of a first steering shaft 2a. The lower end of the first steering shaft 2a is connected to the upper end of a second steering shaft 2b by a torque sensor 3. The torque sensor 3 includes a torque-displacement converter 3a which produces a displacement which is proportional to the steering torque applied to the steering wheel 1 by the driver of the vehicle. Any conventional torque-displacement converter can be employed, such as the torque-displacement converter disclosed in U.S. Pat. No. 4,666,010 in which a torsion bar which connects two steering shafts undergoes angular displacement due to twisting which is proportional to the steering torque applied to a steering wheel. The torque sensor 3 also includes a right turn potentiometer 3d and a left turn potentiometer 3e. Each potentiometer has a wiper arm which is moved along a resistive element by the displacement of the torque-displacement converter 3a. The voltage at the wiper arm of each potentiometer constitutes an output voltage of the torque sensor 3 and is provided to a control unit 9 as an indication of the steering torque to the right or to the left, respectively.

The lower end of the second steering shaft 2b is connected to the upper end of a third steering shaft 2c by a first universal joint 4a, and the lower end of the third steering shaft 2c is connected to the upper end of a drive shaft 5 by a second universal joint 4b. A pinion gear 5a is formed on the lower end of the drive shaft 5. The pinion gear 5a meshes with a rack 6 of the steering gear of the vehicle.

An auxiliary torque can be applied to the drive shaft 5 by an electric motor 7 such as a shunt-wound or permanent magnet DC motor. The motor 7 is connected to the drive shaft 5 by a reduction gear 8 which reduces the rotational speed of the motor 7. The operation of the motor 7 is controlled by the control unit 9, which provides the motor 7 with a pulse width modulated drive signal.

The control unit 9 is powered by the vehicle battery 10, which typically is a 12-volt battery. Portions of the control unit 9 are connected directly to the battery 10, while other portions are connected to the battery 10 via a key switch 11. A vehicle speed sensor 12 generates an output signal having a frequency which is proportional to the vehicle speed. This output signal is supplied to the control unit 9.

Figure 2:
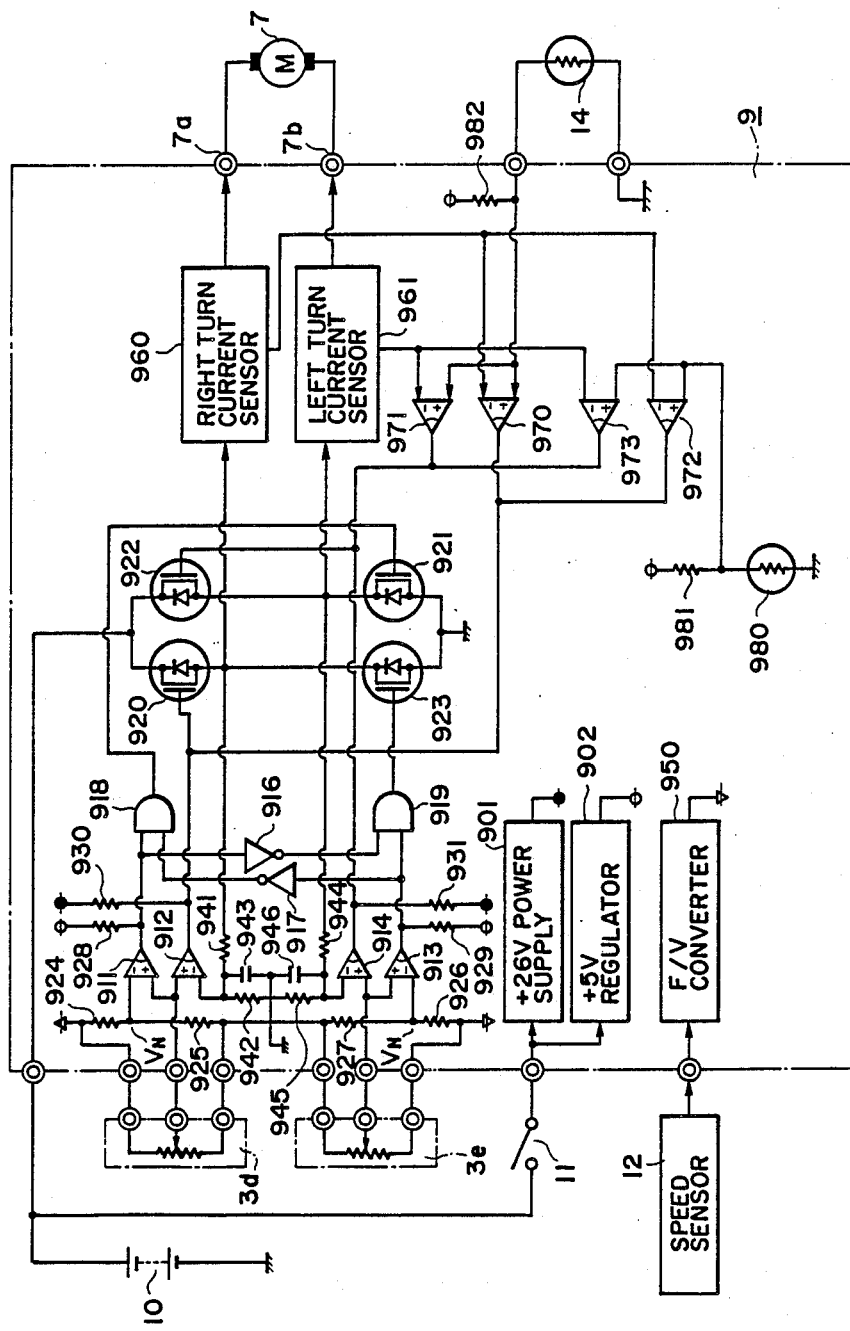
FIG. 2 is a circuit diagram of the control unit of the embodiment of FIG. 1.

FIG. 2 is a circuit diagram of the control unit 9 of FIG. 1, which constitutes a self-excited pulse width modulation circuit with feedback from the motor 7. A first comparator 911 has a positive input terminal which is connected to the wiper arm of the right turn potentiometer 3d and a negative input terminal which is connected to the junction of two series resistors 924 and 925. A second comparator 912 has a positive input terminal which is connected to the wiper arm of the right turn potentiometer 3d and a negative input terminal which is connected to ground through a resistor 942. A third comparator 913 has a positive input terminal which is connected to the wiper arm of the left turn potentiometer 3e and a negative input terminal which is connected to the junction of two series resistors 926 and 927. A fourth comparator 914 has a positive input terminal which is connected to the wiper arm of the left turn potentiometer 3e and a negative input terminal which is grounded through a resistor 945.

Resistors 924 and 925 are connected in series between the output terminal of a frequency-voltage converter 950 and ground. Resistors 926 and 927 are likewise connected in series between the output terminal of the frequency-voltage converter 950 and ground. A terminal which is connected to one end of the resistive element of each potentiometer 3d and 3e is connected to the output terminal of the frequency-voltage converter 950, while the terminal at the other end of the resistive element is grounded.

The output terminals of the first comparator 911 and the third comparator 913 are connected to the output terminal of a 5-volt voltage regulator 902 by pull-up resistors 928 and 929, respectively. The output terminals of the second comparator 912 and the fourth comparator 914 are connected to the output terminal of a 26-volt power supply 901 by pull-up resistors 930 and 931, respectively.

The output terminal of the first comparator 911 is also connected to the input terminal of a first inverter 916 and to one of the input terminals of a first AND gate 918. The output terminal of the third comparator 913 is connected to the input terminal of a second inverter 917 and to one of the input terminals of a second AND gate 919. The output terminal of the first inverter 916 is connected to the other input terminal of the second AND gate 919, and the output terminal of the second inverter 917 is connected to the other input terminal of the first AND gate 918.

The electric motor 7 is driven by power switching elements in the form of first through fourth power MOSFET's 920–923. The gate of the first MOSFET 920 is connected to the output terminal of the second comparator 912, its drain is connected to the battery 10, and its source is connected to a first terminal 7a of the electric motor 7 via a right turn current sensor 960. The gate of the second MOSFET 921 is connected to the output terminal of the first AND gate 918, its drain is connected to a second terminal 7b of the motor 7 via a left turn current sensor 961, and its source is grounded. The gate of the third MOSFET 922 is connected to the output terminal of the fourth comparator 914, its drain is connected to the battery 10, and its source is connected to the second terminal 7b of the electric motor 7 via the left turn current sensor 961. The gate of the fourth MOSFET 923 is connected to the output terminal of the second AND gate 919, its drain is connected to the first terminal 7a of the electric motor 7 via the right turn current sensor 960, and its source is grounded.

The first terminal 7a of the motor 7 receives a positive input voltage when the motor 7 is being driven so as to steer the wheels of the vehicle for a right turn, and the second terminal 7b receives a positive input voltage during a left turn.

The motor current passes through the right turn current sensor 960 and the left turn current sensor 961, which respectively generate output voltages corresonding to the motor current during a right turn and a left turn.

A resistor 941 is connected between the first terminal 7a of the motor 7 and resistor 942, and a capacitor 943 is connected from the junction of resistors 941 and 942 to ground. Similarly, a resistor 944 is connected between the second terminal 7b of the motor 7 and resistor 945, and a capacitor 946 is connected from the junction of resistors 944 and 945 to ground. Capacitors 943 and 946 determine the frequency of self-excited oscillation of the control unit 9. Via resistors 941 and 944, the second and fourth comparators 912 and 914 receive feedback signals from the motor 7.

The power supply 901 and the voltage regulator 902 are connected to the battery 10 by the key switch 11. The above-mentioned frequency-voltage converter 950 receives the output signal of the vehicle speed sensor 12 and generates an output voltage which is inversely proportional to the frequency of the speed signal. The output voltage of the frequency-voltage converter 950 is provided to the potentiometers 3d and 3e and resistors 924 and 926 as a positive supply voltage.

The output voltage of the right turn current sensor 960 is provided to the negative input terminals of a fifth comparator 970 and a seventh comparator 972. The output voltage of the left turn current sensor 961 is provided to the negative input terminals of a sixth comparator 971 and an eighth comparator 973. The output terminals of the fifth comparator 970 and the seventh comparator 972 are both connected to the gate of the first MOSFET 920. The output terminals of the sixth comparator 971 and the eighth comparator 973 are both connected to the gate of the third MOSFET 922.

A resistor 982 and a first temperature sensor 14 in the form of a thermistor are connected in series between the output terminal of the voltage regulator 902 and ground. The resistance of the first temperature sensor 14 decreases as its temperature increases. The first temperature sensor 14 is disposed in the vicinity of the motor 7 and senses its temperature. The junction of resistor 982 and the first temperature sensor 14 is connected to the positive input terminals of the fifth comparator 970 and the sixth comparator 971.

A resistor 981 and a second temperature sensor 980 in the form of a thermistor are connected in series between the output terminal of the voltage regulator 902 and ground. The resistance of the second temperature sensor 980 decreases as its temperature increases. The second temperature sensor 980 is disposed in the vicinity of the MOSFET's 920-923 and senses their temperature. The junction of resistor 981 and the second temperature sensor 980 is connected to the positive input terminals of the seventh comparator 972 and the eighth comparator 973.

The current sensors 960 and 961, the comparators 970-973, and MOSFET's 920 and 922 together constitute a current limiting device for limiting the motor current in accordance with the temperature of the motor 7 and the temperature of the MOSFET's 920 -923.

Figure 5:
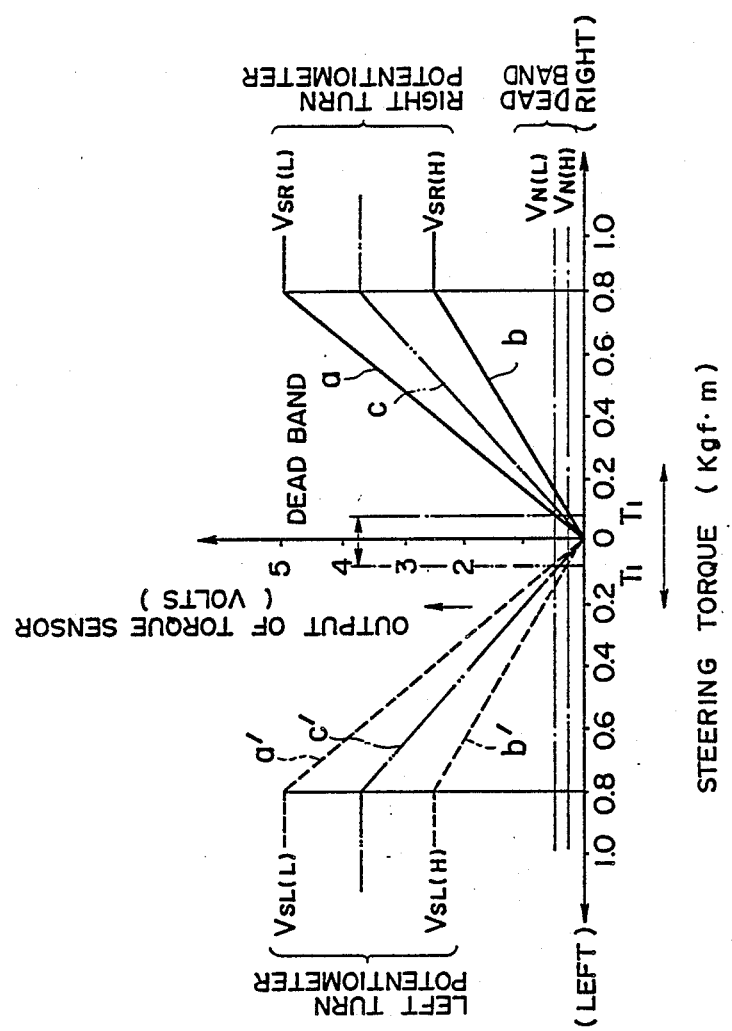
FIG. 5 is a graph showing the output of the torque sensor as a function of the steering torque applied to the steering wheel by the driver of the vehicle.

FIG. 5 illustrates the output characteristics of the torque sensor 3 as a function of the steering torque applied to the steering wheel 1 by the driver. When no steering torque is applied to the steering wheel 1, the output of both potentiometers 3d and 3e is zero volts. When a rightward torque is applied to the steering wheel 1, the output of the right turn potentiometer 3d increases linearly with increasing torque until the steering torque reaches a value of approximately 0.8 kgf-m, at which the output voltage saturates at a voltage $V_{SR}$. When the right turn potentiometer 3d has a non-zero output, the output of the left turn potentiometer 3e remains at zero volts. Conversely, when a leftward steering torque is applied to the steering wheel 1, the output of the right turn potentiometer 3d is zero volts, while the output of the left turn potentiometer 3e increases linearly with increasing steering torque until the steering torque reaches approximately 0.8 kgf-m, upon which the output saturates at a voltage $V_{SL}$. As will be explained below, the levels of $V_{SR}$ and $V_{SL}$ depend upon the vehicle speed.

Figure 6:
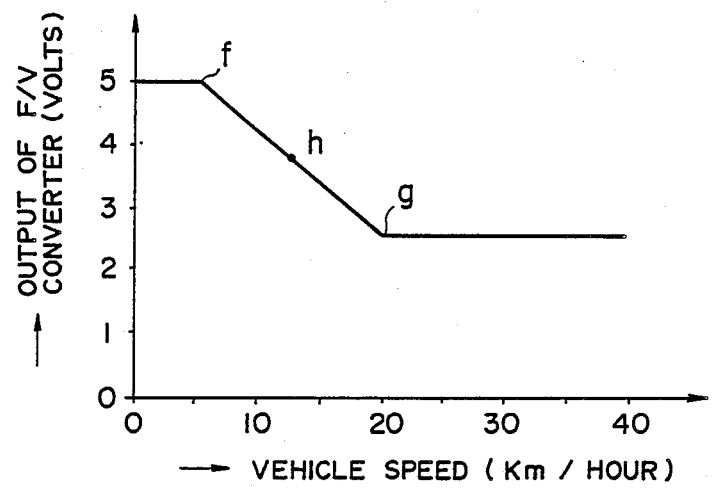
FIG. 6 is a graph of the output of the frequency-voltage converter as a function of the speed of the vehicle.

FIG. 6 is a graph illustrating the output characteristics of the frequency-voltage converter 950 as a function of the vehicle speed. At a low vehicle speed of up to approximately 5 km/hr (point f in FIG. 6), the frequency-voltage converter 950 generates a constant voltage of approximately 5 volts. At a vehicle speed of greater than approximately 20 km/hr (point g), the frequency-voltage converter 950 generates a constant output voltage of approximately 2.5 volts. At a vehicle speed between approximately 5 and 20 km/hr, the output voltage of the frequency-voltage converter 950 linearly decreases as the vehicle speed increases.

The output voltage of the frequency-voltage converter 950 is supplied to the potentiometers 3d and 3e as a positive supply voltage. Since the output voltage of the frequency-voltage converter 950 varies in accordance with vehicle speed, the output characteristics of the torque sensor 3 are also dependent on the vehicle speed. As shown in FIG. 5, when the vehicle speed is below that corresponding to point f of FIG. 6 (approximately 5 km/hr), the output characteristics of the potentiometers 3d and 3e are as shown by curves a and a', respectively, which have a steep slope and a high saturation voltage $V_{SR(L)}$ and $V_{SL(L)}$ of approximately 5 volts. When the vehicle speed is above that corresponding to point g of FIG. 6 (approximately 20 km/hour), the output characteristics of the potentiometers 3d and 3e are shown by curves b and b', respectively, which have a more gradual slope and a lower saturation voltage $V_{SR(H)}$ and $V_{SL(H)}$ of approximately 2.5 volts. When the vehicle speed is between 5 and 20 km/hour, the output characteristics of the potentiometers 3d and 3e are described by curves lying somewhere between curves a and b or a' and b'. For example, when the vehicle speed is that corresponding to point h of FIG. 6 (approximately 12.5 km/hour) midway between points f and g, the output characteristics of the potentiometers 3d and 3e are as shown by curves c and c', respectively, lying midway between curves a and b (or a' and b').

When the unillustrated engine of the vehicle is started and the key switch 11 is closed, 12 volts are supplied by the battery 10 to the power supply 901 and the voltage regulator 902, and the control unit 9 begins to operate. It will be assumed that the vehicle is initially stationary, so the vehicle speed sensor 12 generates a signal corresponding to a speed of 0 km/hour. As shown in FIG. 6, the frequency-voltage converter 950 therefore generates a maximum output voltage of approximately 5 volts. This output voltage is supplied to the potentiometers 3d and 3e and to resistors 924 and 926 as a positive supply voltage. If the driver then applies a steering torque to the steering wheel 1, the torque sensor 3 generates an output voltage corresponding to the magnitude and direction of the steering torque as shown in FIG. 5.

When the driver applies a steering torque to the steering wheel 1 to turn the wheels of the vehicle to the right, the voltage of the wiper arm of the right turn potentiometer 3d is input to the positive input terminals of the first and second comparators 911 and 912. If the output voltage of the right turn potentiometer 3d exceeds the voltage $V_N$ at the junction of resistors 924 and 925, the output of the first comparator 911 goes high. As no voltage has yet been applied to the motor 7, the voltage at the junction of resistors 941 and 942 is low, and the output of the second comparator 912 goes high. The output voltage of the left turn potentiometer 3e is 0 volts, so the outputs of the third and fourth comparators 913 and 914 are low. Therefore, the output of the first inverter 916 is low and the output of the second inverter 917 is high, so the output of the first AND gate 918 is high, the output of the second AND gate 919 is low, and the first and second MOSFET's 920 and 921 are turned on. Therefore, a voltage from the battery 10 is applied to the motor 7 through the first MOSFET 920, and the motor 7 begins to conduct. The positive input voltage for the motor 7, i.e., the voltage at terminal 7a, is also applied across resistors 941 and 942. Therefore, the voltage at the junction of resistors 941 and 942 rises exponentially with a time constant determined by capacitor 943. When the voltage at the junction of resistors 941 and 942 exceeds the voltage at the positive input terminal of the second comparator 912, which is the output voltage of the right turn potentiometer 3d, the output of the first comparator 911 remains high but the output of the second comparator 912 goes low, so the first MOSFET 920 is turned off, and the supply of current to the motor 7 is interrupted. When this interruption takes place, the voltage at the junction of resistors 941 and 942 falls exponentially with a time constant determined by capacitor 943. When the voltage at the junction of resistors 941 and 942 falls below the voltage at the positive input terminal of the second comparator 912, the output of the second comparator 912 again goes high, and the first MOSFET 920 is again turned on to drive the motor 7. In this manner, the second comparator 912 is repeatedly turned on and off, and a series of pulses are supplied to the motor 7 as a supply voltage. A current which is determined by the supply voltage and the counter emf corresponding to the rotational speed of the motor 7 flows through the motor 7. The motor 7 generates an auxiliary torque to turn the wheels of the vehicle to the right, and the steering torque which need be exerted by the driver of the vehicle is reduced. The width of the pulses which are supplied to the motor 7 is dependent on the output voltage of the potentiometer 3d. The greater the output voltage of the potentiometer 3d, the longer is the pulse width.

When the driver exerts a steering torque to turn the vehicle to the left, the third and fourth comparators 913 and 914 are controlled in a manner similar to that described above with respect to the first and second comparators 911 and 912, and a voltage is supplied to the motor 7 to steer the wheels of the vehicle to the left.

As shown in FIG. 5, the output voltage of the potentiometers 3d and 3e corresponding to a given steering torque decreases as the vehicle speed increases. Since the torque generated by the motor 7 decreases as the output voltage of the potentiometers 3d and 3e decreases, it follows that the auxiliary torque generated by the motor 7 in response to a prescribed steering torque decreases as the vehicle speed increases. This decrease in auxiliary torque compensates for the decrease in resistance to steering as the vehicle speed increases. Therefore, the feel of the steering wheel remains comfortable without becoming too light at high vehicle speeds, and the safety of the vehicle is maintained.

The AND gates 918 and 919 prevent the motor 7 from operating unless the output of either the first comparator 911 or the third comparator 913 is high. This state occurs when the output voltage of the right turn potentiometer 3d exceeds the voltage $V_N$ at the junction of resistors 924 and 925, or when the output voltage of the left turn potentiometer 3e exceeds the voltage $V_N$ at the junction of resistors 926 and 927. If the driver exerts only a very low torque of less than T1 on the steering wheel 1, the outputs of the potentiometers 3d and 3e will not exceed $V_N$, so the motor 7 will not be turned on. Accordingly, there is a dead band of steering torque on either side of a neutral torque in which power steering is not performed. The magnitude of the dead band, i.e., the magnitude of T1, depends on the value of $V_N$ and on the output characteristics of the potentiometers 3d and 3e. In the present embodiment, $V_N$ is a function of the output voltage of the frequency-voltage converter 950, and so $V_N$ varies with the vehicle speed. As shown in FIG. 5, at a low vehicle speed below that corresponding to point f of FIG. 6, $V_N$ has a maximum value of $V_{N(L)}$, and at a vehicle speed above that corresponding to point g of FIG. 6, it has a minimum value of $V_{N(H)}$. When the vehicle speed is somewhere between that corresponding to points f and g, $V_N$ has a level somewhere between $V_{N(L)}$ and $V_{N(H)}$. Thus, $V_N$ decreases as the vehicle speed increases. However, as $V_N$ decreases, the slopes of the curves defining the output characteristics of the potentiometers also decrease, so T1 and the magnitude of the dead band remain constant at all vehicle speeds.

Normally, only one of the potentiometers generates an output voltage at a time. If the potentiometers should malfunction (due, for example, to noise generated by the torque sensor 3 itself, bad contacts, broken wires, or short circuits) and both generate an output voltage of greater than $V_N$ at the same time, the outputs of both AND gates 918 and 919 will go low and prevent MOSFET'S 921 and 923 from conducting. Therefore, the motor 7 will not be able to operate, and there will be no possibility of the motor 7 exerting an auxiliary torque in a direction opposite to the direction in which the driver wishes to steer the vehicle. Although the steering will feel heavy when the motor 7 does not operate, as the steering wheel 1 is mechanically linked to the rack 6, the driver will still be able to safely steer the vehicle.

When the voltage regulator 902 is turned on, current flows through the first temperature sensor 14 and the second temperature sensor 980. The resulting voltage at the junction of resistors 982 and the first temperature sensor 14 is applied to the positive input terminals of the fifth and sixth comparators 970 and 971 as a first reference voltage indicating a first current limit for the motor. The voltage at the junction of reistors 981 and the second temperature sensor 980 is applied to the positive input terminals of the seventh and eighth comparators 972 and 973 as a second reference voltage indicating a second current limit for the motor.

It will first be assumed that the first current limit is lower than the second current limit. If the motor current exceeds the first current limit, the output voltage of one of the current sensors 960 and 961 will exceed the first reference voltage, and the fifth comparator 970 (during a right turn) or the sixth comparator 971 (during a left turn) will produce a low output voltage. The low output voltage of the fifth comparator 970 or the sixth comaprator 971 turns off MOSFET 920 (during a right turn) or MOSFET 922 (during a left turn), thereby cutting off the supply of current to the motor 7.

When MOSFET 920 or 922 is turned off, the current of the motor 7 decreases exponentially with a time constant determined by its internal inductance and resistance. When the motor current falls below the first current limit, the fifth comparator 970 (during a right turn) or the sixth comparator 971 (during a left turn) again outputs a high voltage, which again turns on MOSFET 920 (during a right turn) or MOSFET 922 (during a left turn), thereby supplying the motor 7 with current. In this manner, MOSFET 920 or 922 will be repeatedly turned on and off by the fifth comparator 970 or the sixth comparator 971, and the motor current will be controlled to be the first current limit.

Next, it will be assumed that the second current limit is lower than the first current limit. If the motor current exceeds the second current limit, the output voltage of one of the current sensors 960 and 961 will exceed the second reference voltage, and the seventh comparator 972 (during a right turn) or the eighth comparator 973 (during a left turn) will produce a low output voltage. The low output voltage of the seventh comparator 972 or the eighth comparator 973 turns off MOSFET 920 (during a right turn) or MOSFET 922 (during a left turn), thereby cutting off the supply of current to the motor 7.

When MOSFET 920 or 922 is turned off, the current of the motor 7 decreases exponentially with a time constant determined by its internal inductance and resistance. When the motor current falls below the second current limit, the seventh comparator 972 (during a right turn) or the eighth comparator 973 (during a left turn) again outputs a high voltage, which again turns on MOSFET 920 (during a right turn) or MOSFET 922 (during a left turn), thereby supplying the motor 7 with current. Thus, MOSFET 920 or 922 will be repeatedly turned on and off by the seventh comparator 972 or the eighth comparator 973, and the motor current will be controlled to be the second current limit.

Figure 7:
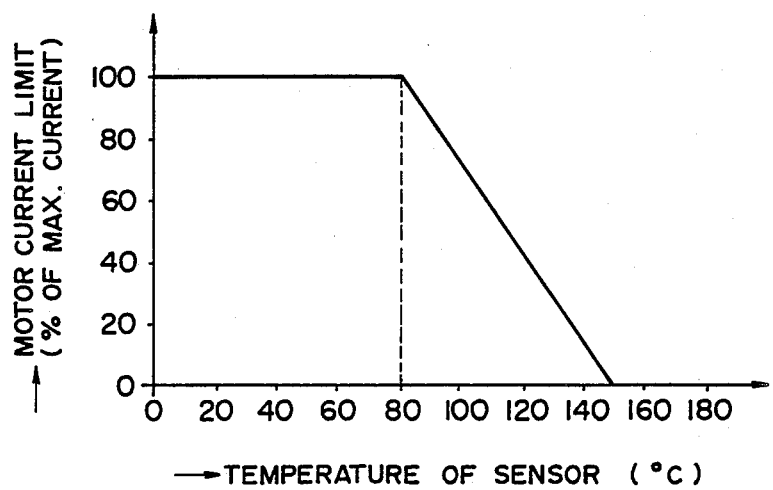
FIG. 7 is a graph of the current limit for the motor as a function of the temperature detected by the temperature sensors.

The motor current is therefore prevented from rising above the first current limit or the second current limit, whichever is lower. As shown in FIG. 7, the first and second current limits decrease as the temperature of the motor 7 and the temperature of the MOSFET's 920–923 respectively increase. The motor current can therefore be prevented from rising above a level at which the motor or the MOSFET's could overheat from excess current. As a result, there is no danger of heat damage to the motor or the MOSFET's, even if they are designed for a low rated current. This enables the power steering apparatus of the present invention to be economically manufactured using inexpensive components and yet still exhibit excellent reliability.

Figure 3:
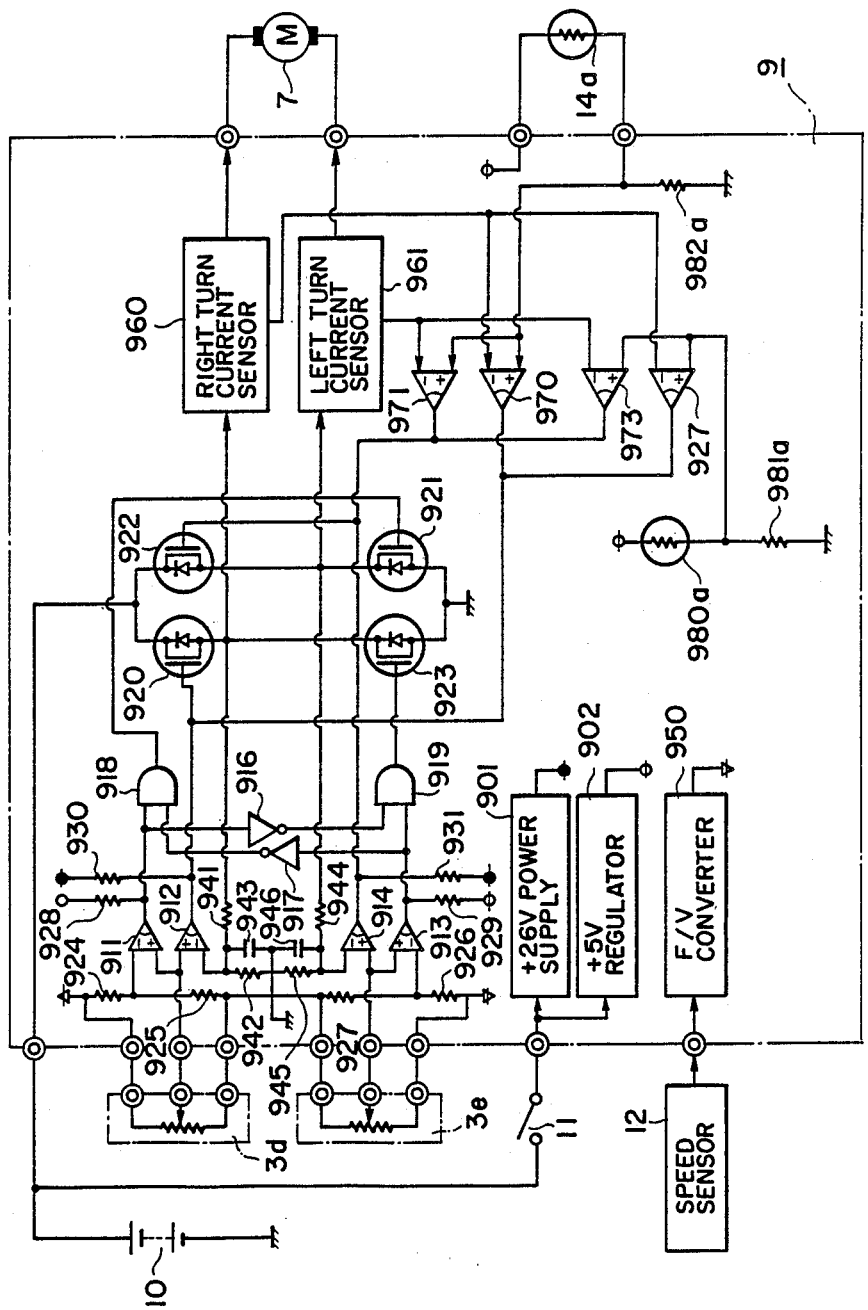
FIG. 3 is a circuit diagram of the control unit of a second embodiment of the present invention.

FIG. 3 is a circuit diagram of the control unit 9 of a second embodiment of this invention. This embodiment differs from the embodiment of FIG. 2 in that a first temperature sensor 14a and a second temperature sensor 980a both comprise thermistors which increase in resistance with increasing temperature. The first temperature sensor 14a is connected between the output terminal of the voltage regulator 902 and a grounded resistor 982a, and the second temperature sensor 980a is connected between the output terminal of the voltage regulator 902 and another grounded resistor 981a. The junction of the first temperature sensor 14a and resistor 982a is connected to the positive input terminals of the fifth and sixth comparators 970 and 971, and the junction of the second temperature sensor 980a and resistor 981a is connected to the positive input terminals of the seventh and eighth comparators 972 and 973. The structure of this embodiment is otherwise the same as that of the embodiment of FIG. 2, and it operates in the same manner.

Figure 4:
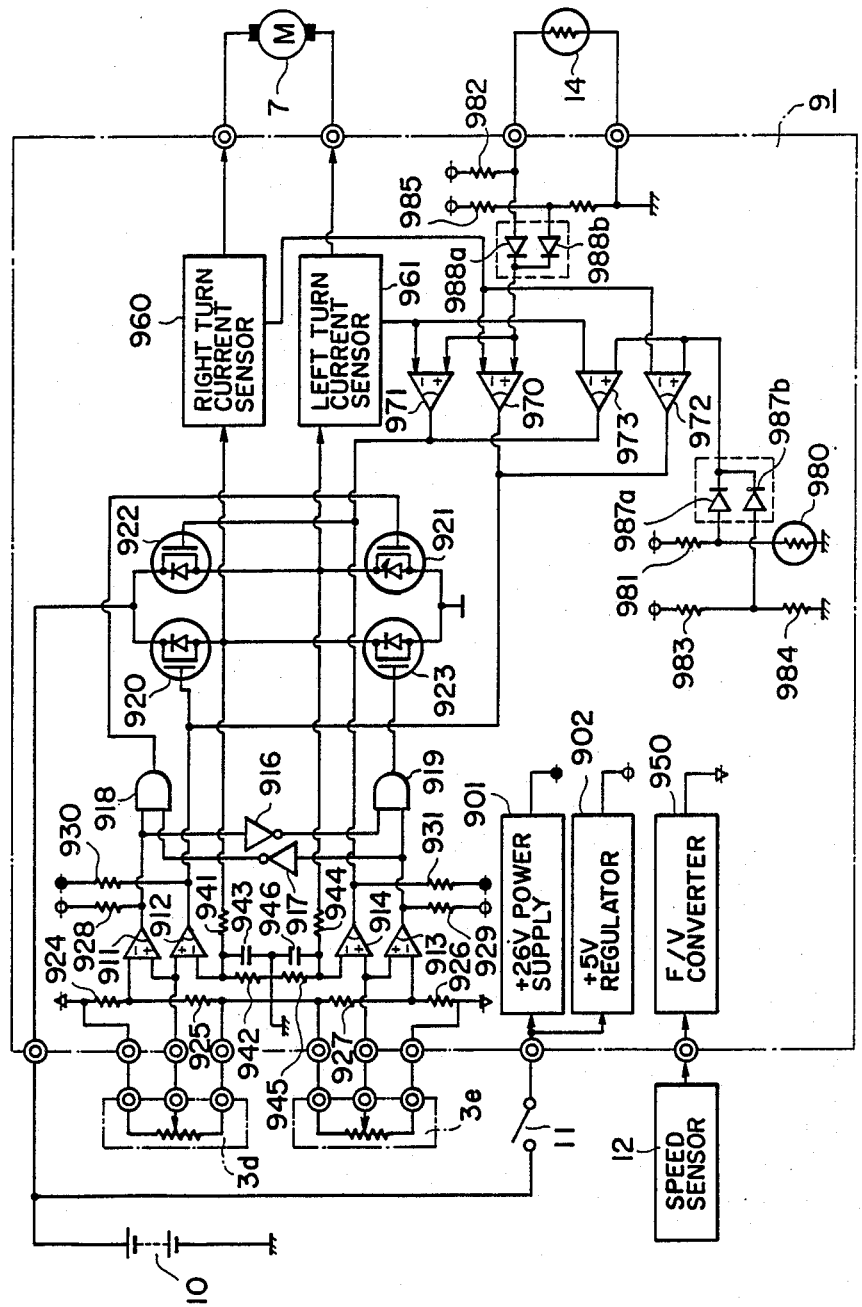
FIG. 4 is a circuit diagram of the control unit of a third embodiment of the present invention.

FIG. 4 is a circuit diagram of the control unit 9 of a third embodiment of the present invention. This embodiment has the same basic structure as the embodiment of FIG. 2 with a first temperature sensor 14 and a second temperature sensor 980 in the form of thermistors which decrease in resistance with increasing temperature. The junction of resistor 982 and the first temperature sensor 14 is connected to the positive input terminal of the fifth and sixth comparators 970 and 971 through a diode 988a. Two resistors 985 and 986 are connected in series between the output terminal of the voltage regulator 902 and ground. The junction of the two resistors is connected to the positive input terminals of the fifth and sixth comparators 970 and 971 by another diode 988b.

The junction of resistor 981 and the second temperature sensor 980 is connected to the positive input terminal of the seventh and eighth comparators 972 and 973 through a diode 987a. Two resistors 983 and 984 are connected in series between the output terminal of the voltage regulator 902 and ground. The junction of the two resistors is connected to the positive input terminals of the seventh and eighth comparators 972 and 973 by another diode 987b.

The structure of this embodiment is otherwise the same as that of the embodiment of FIG. 2, and it operates in a similar manner. The diodes provide the effect that the motor current limit is independent of temperature until the temperature sensed by the temperature sensors exceeds a prescribed value. Thus, as shown in FIG. 7, the maximum motor current is maintained at a constant value up to a threshold temperature of 80° C., for example, upon which the current limit begins to fall. The threshold temperature can be adjusted by changing the values of the series resistors 983–986.

What is claimed is:

1. A motorized power steering apparatus for a vehicle comprising:
   torque sensing means for generating an output voltage proportional to a steering torque exerted by a driver of the vehicle;
   a motor for generating an auxiliary steering force;
   motor control means for controlling the output torque of the motor in accordance with the output voltage of the torque sensing means, said motor controller comprising power switching elements;
   temperature sensing means for sensing a temperature which is dependent on the motor current, wherein said temperature sensing means comprises means for sensing the temperature of the power switching elements and the temperature of the motor; and
   current limiting means for limiting the motor current to a current limit which decreases as the sensed temperature increases, wherein said current limiting means comprises means for cutting off the current to said motor at a current limit which decreases as either of the sensed temperatures increases.

2. A power steering apparatus as claimed in claim 1, wherein the torque sensing means comprises means for generating an output signal which is proportional to a supply voltage and to the steering torque, the power steering apparatus further comprising voltage supply means for supplying the torque sensing means with a supply voltage which decreases as the vehicle speed increases.

3. A power steering apparatus as claimed in claim 2, wherein the voltage supply means comprises:
   a vehicle speed sensor for generating a vehicle speed signal having a frequency proportional to the vehicle speed; and
   a frequency-voltage converter for generating an output voltage which decreases as the frequency of the vehicle speed signal increases and which is supplied to the torque sensing means as the supply voltage.

4. A power steering apparatus as claimed in claim 1, wherein the motor control means comprises a self-excited pulse width modulation circuit with feedback from the motor for supplying the motor with drive pulses having a pulse width which is modulated by the output voltage of the torque sensing means.

5. A power steering apparatus as claimed in claim 4, wherein the pulse width modulation circuit comprises:
- a bridge circuit consisting of a plurality of switching elements, the motor being connected across the bridge circuit;
- a capacitor and a resistor connected in parallel between the motor and ground; and
- a comparator having a first input terminal to which the output voltage of the torque sensing means is applied and a second input terminal connected to the junction of the capacitor and the resistor, the output voltage of the comparator being supplied to a gate of one of the switching elements of the bridge circuit.

6. A power steering apparatus as claimed in claim 1, wherein the temperature sensing means comprises means for generating a reference voltage corresponding to the sensed temperature, and the current limiting means further comprises:
- current sensing means for generating an output voltage proportional to the motor current;
- detecting means for detecting that the motor current exceeds the current limit by comparing the reference voltage and the output voltage of the current sensing means; and
- preventing means for preventing current from being supplied to the motor when the detecting means detects that the motor current exceeds the current limit.

* * * * *